United States Patent
Zhuang

(10) Patent No.: US 11,497,332 B2
(45) Date of Patent: Nov. 15, 2022

(54) SHOE LIFTER WITH CLAMP

(71) Applicant: Ruzhuo Zhuang, Shenzhen (CN)

(72) Inventor: Ruzhuo Zhuang, Shenzhen (CN)

( * ) Notice: Subject to any disclaimer, the term of this patent is extended or adjusted under 35 U.S.C. 154(b) by 71 days.

(21) Appl. No.: 17/138,950

(22) Filed: Dec. 31, 2020

(65) Prior Publication Data

US 2021/0120992 A1    Apr. 29, 2021

(30) Foreign Application Priority Data

Dec. 8, 2020   (CN) .......................... 202022915535.5

(51) Int. Cl.
*A47G 25/82*     (2006.01)
*B25J 1/04*      (2006.01)

(52) U.S. Cl.
CPC ................. *A47G 25/82* (2013.01); *B25J 1/04* (2013.01)

(58) Field of Classification Search
CPC ........ A47G 25/90; A47G 25/80; A47G 25/82; A47G 25/905; A61H 2003/0222; A45B 3/00; B25J 1/00; B25J 1/02; B25J 1/04
USPC ................... 223/111, 112, 118, 119; 135/66; 294/103.1, 104, 111
See application file for complete search history.

(56) References Cited

U.S. PATENT DOCUMENTS

| | | | | |
|---|---|---|---|---|
| 3,425,734 A | * | 2/1969 | Hollis ...................... | A45B 3/00 294/104 |
| 3,591,226 A | * | 7/1971 | Elmore, Jr. ............ | A47G 25/82 223/119 |
| 4,647,094 A | * | 3/1987 | Bergkvist ................... | B25J 1/04 294/111 |
| 4,709,839 A | * | 12/1987 | Tucker ................... | A47G 25/82 223/119 |
| 5,176,160 A | * | 1/1993 | Osborn ..................... | A45B 3/00 135/70 |
| 5,192,104 A | * | 3/1993 | Lin ............................ | B25J 1/04 D22/150 |
| 5,392,800 A | * | 2/1995 | Sergi ........................ | A45B 3/00 135/65 |
| 5,636,650 A | * | 6/1997 | Kroeze .................... | A45B 9/00 135/70 |
| 5,640,985 A | * | 6/1997 | Snyder ..................... | A61H 3/02 135/65 |
| 6,550,490 B1 | * | 4/2003 | Morton ..................... | E01H 1/12 135/65 |
| 6,669,254 B2 | * | 12/2003 | Thom ....................... | B25J 1/04 294/104 |
| 6,951,224 B2 | * | 10/2005 | Garrett ..................... | A45B 3/00 223/119 |
| 7,665,782 B2 | * | 2/2010 | Buzby .................... | E01H 1/1206 294/109 |
| D655,589 S | * | 3/2012 | Owens .............................. | D8/51 |

(Continued)

*Primary Examiner* — F Griffin Hall

(57) ABSTRACT

A shoe lifter with a clamp comprises a rear handle cover, a front handle cover and a clamp head. One end of the front handle cover is hinged to the rear handle cover. A connecting rod is disposed on the rear handle cover. A push-and-pull rod is hinged to one end of the connecting rod, and a rope is connected to the other end of the connecting rod. A movable clamp piece is hinged to the clamp head and has an arc clamp edge and a connecting end. The clamp head is provided with a fixed clamp piece which is exactly opposite to the arc clamp edge. The shoe lifter is additionally provided with the clamp head to clamp shoes, so that users do not need to take shoes directly by hand, and sanitary protection is improved.

5 Claims, 3 Drawing Sheets

(56) References Cited

U.S. PATENT DOCUMENTS

| | | | |
|---|---|---|---|
| 8,381,748 B2* | 2/2013 | Martin | E01H 1/12 |
| | | | 135/84 |
| 8,714,170 B1* | 5/2014 | Bonne | A45B 3/00 |
| | | | 135/84 |
| 8,978,677 B2* | 3/2015 | Roberts | A45B 3/00 |
| | | | 135/70 |
| 9,004,563 B2* | 4/2015 | Buzby | B25B 9/00 |
| | | | 294/115 |
| 9,277,794 B2* | 3/2016 | Moreau | A45B 9/00 |
| 9,326,630 B1* | 5/2016 | Showalter | A47G 25/82 |
| D764,884 S * | 8/2016 | Kuna | D8/51 |
| 10,413,026 B1* | 9/2019 | Grivna | E01H 1/12 |
| 10,780,013 B1* | 9/2020 | Feld | A45B 3/00 |

* cited by examiner

SHOE LIFTER WITH CLAMP

BACKGROUND OF THE INVENTION

1. Technical Field

The invention relates to the technical field of articles of daily use, in particular to a shoe lifter with a clamp.

2. Description of Related Art

Shoe lifters are placed in the heels of shoes to allow users to tread thereon to wear the shoes easily and rapidly without directly touching the shoes with both hands, thus being sanitary and convenient to use.

At present, most existing shoe lifters have a simple structure and are designed with a curved surface for assisting users in wearing shoes. However, these shoe lifters have no other functions. By using such shoe lifters, users can wear shoes without touching the shoes, but they still have to pick the shoes with both hands, which makes it impossible to wear shoes without contact with the shoes, and a sanitary effect cannot be realized actually.

BRIEF SUMMARY OF THE INVENTION

In view of the defects of the prior art, the objective of the invention is to provide a shoe lifter with a clamp.

To fulfill the aforesaid objective, the technical solution adopted by the invention is as follows:

A shoe lifter with a clamp comprises a rear handle cover, a front handle cover and a clamp head, wherein the front handle cover is located on one side of the rear handle cover and has an end hinged to the rear handle cover, a connecting rod is disposed on the rear handle cover, a push-and-pull rod is hinged to one end of the connecting rod, a rope is connected to the other end of the connecting rod, the tail end of the push-and-pull rod abuts against the inner wall of the front handle cover, the rear handle cover is connected to the clamp head through a pipe, a movable clamp piece is hinged to the clamp head and has an arc clamp edge and a connecting end, the clamp head is provided with a fixed clamp piece which is exactly opposite to the arc clamp edge, the connecting end is connected and limited in the clamp head, the rope penetrates through the pipe and is connected to the connecting end, and a portion, located between the connecting end and the inner wall of the clamp head, of the rope is sleeved with a spring.

Preferably, the front handle cover is provided with a partition plate beside the push-and-pull rod, and the rear handle cover is provided with a partition plate beside the connecting rod.

Preferably, anti-slip teeth are arranged on an end face, directly facing the fixed clamp piece, of the arc clamp edge.

Preferably, a wavy concave surface is arranged on an outer end face of the front handle cover Preferably, both ends of the push-and-pull rod are of a arc shape.

According to the above technical solution, the clamp head is additionally arranged and is held by users to be controlled to open or close to pick shoes to the user within a certain range or grasp and place the shoes to a storage place after the shoes are taken off, so that the users do not need to take the shoes directly by hand, and sanitary protection is improved. Moreover, when the users wear shoes, the shoe lifter can assist the users in wearing the shoes like common shoe lifters by means of the arc clamp edge of the movable clamp piece, and is simple in structure, convenient to operate, and high in practicability.

DETAILED DESCRIPTION OF THE INVENTION

The embodiments of the invention will be detailed below in conjunction with the accompanying drawings, and the invention can be implemented in different ways defined and covered by the claims.

Figure 1:
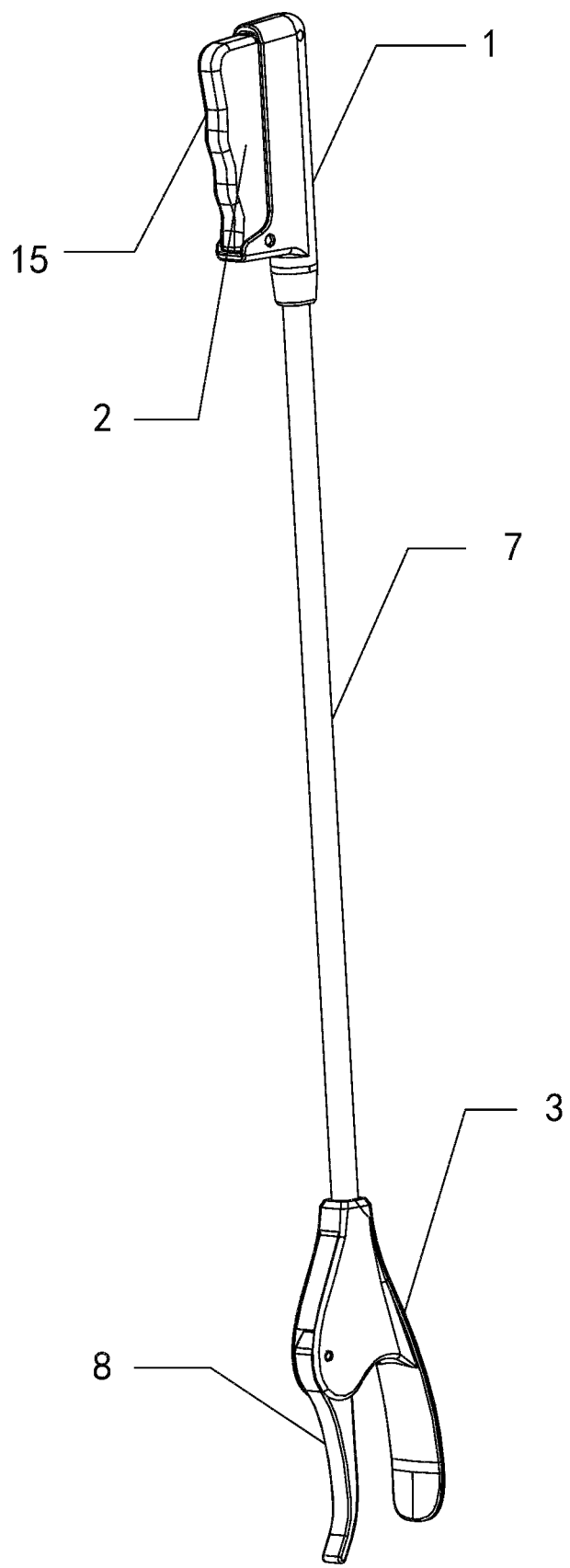
FIG. 1 is a structural schematic diagram of an embodiment of the invention.
Figure 2:
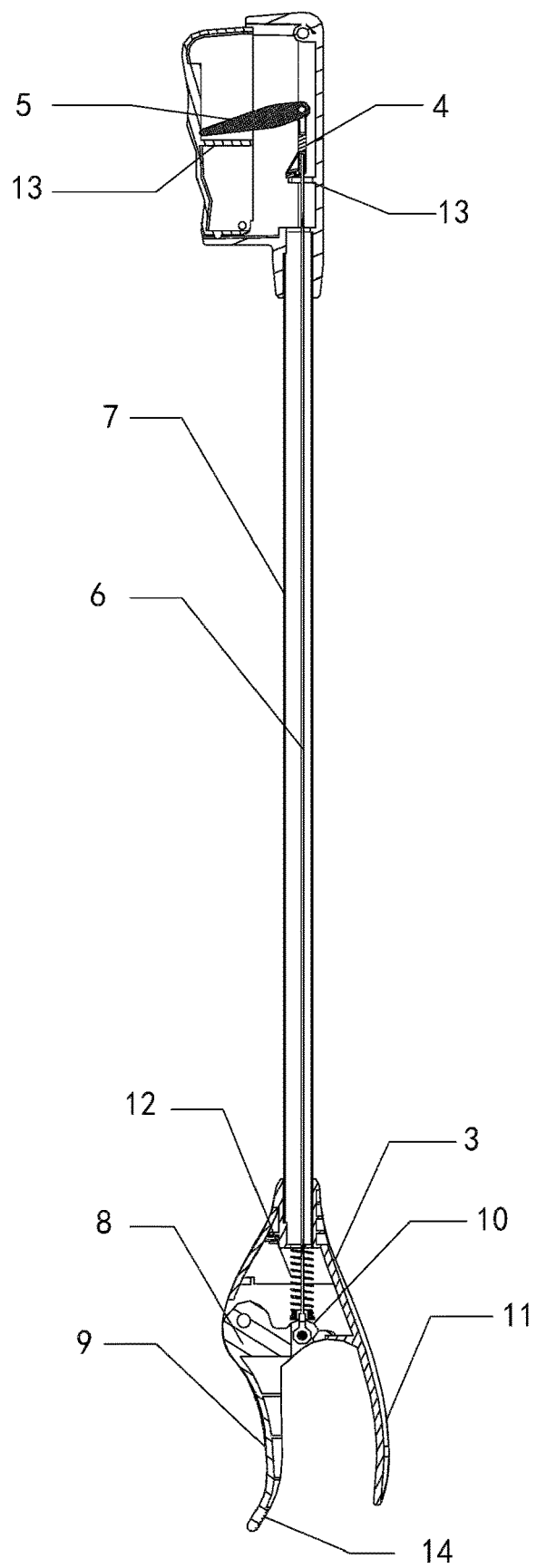
FIG. 2 is a sectional view of the embodiment of the invention.
Figure 3:
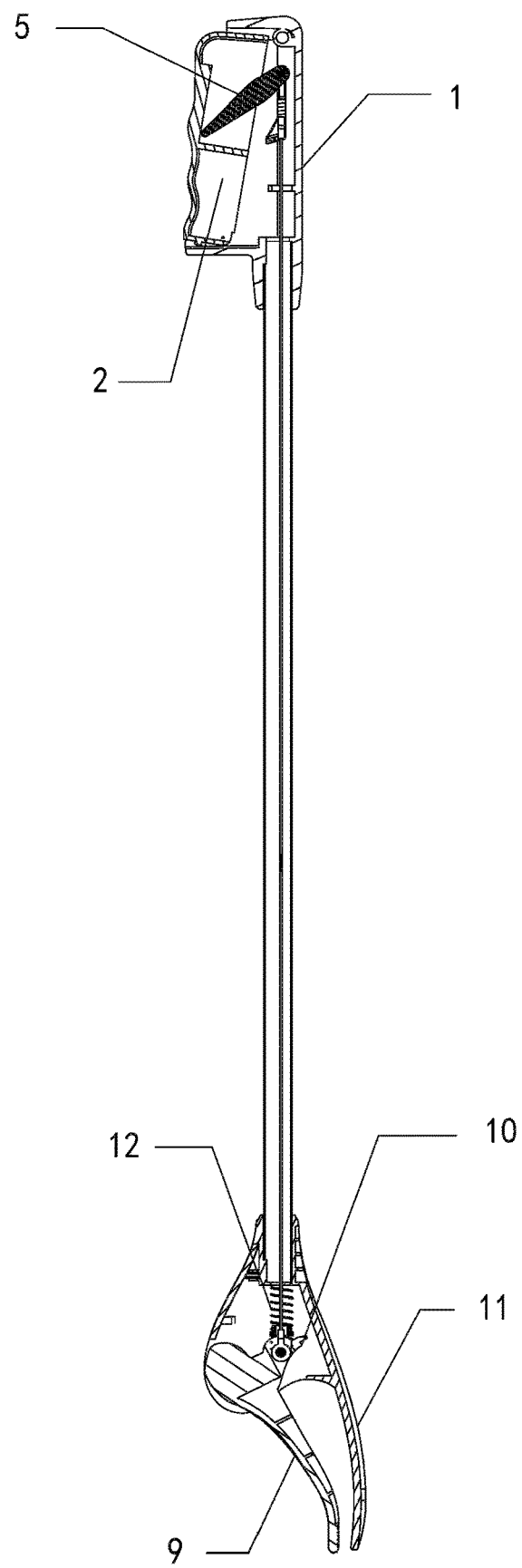
FIG. 3 is a structural diagram of the embodiment of the invention in a clamping state.

As shown in FIG. 1 to FIG. 3, this embodiment provides a shoe lifter with a clamp, comprising a rear handle cover 1, a front handle cover 2 and a clamp head 3, wherein the front handle cover 2 is located on one side of the rear handle cover 1 and has an end hinged to the rear handle cover 1, a connecting rod 4 is disposed on the rear handle cover 1, a push-and-pull rod 5 is hinged to one end of the connecting rod 4, a rope 6 is connected to the other end of the connecting rod 4, and the tail end of the push-and-pull rod 5 abuts against the inner wall of the front handle cover 2; the rear handle cover 1 is connected to the clamp head 3 through a pipe 7, a movable clamp piece 8 is hinged to the clamp head 3 and has an arc clamp edge 9 and a connecting end 10, the clamp head 3 is provided with a fixed clamp piece 11 which is exactly opposite to the arc clamp edge 9, the connecting end 10 is connected and limited in the clamp head 3, the rope 6 penetrates through the pipe 7 and is connected to the connecting end 10, and a portion, located between the connecting end 10 and the inner wall of the clamp head 3, is sleeved with a spring 12.

During specific operation, the arc clamp edge 9 of the movable clamp piece 8 of the clamp head 3 is opened under the effect of the spring 12; when a user needs to clamp a shoe, the user holds the front handle cover 2 and the rear handle cover 1 and applies a force by hand to press the front handle cover 2 inwards, and the push-and-pull rod 5 will be pushed to enable the other end thereof to tilt and pull up the connecting rod 4; after being pulled up, the connecting rod 4 will pull the rope 6, and the connecting end 10 at the other end of the rope 6 will rotate upwards along a hinge point of the movable clamp piece 8 to drive the arc clamp edge 9 to move accordingly and clamp, together with the fixed clamp piece 11, the heel of the shoe; when the front handle cover 2 is released, it will return under the effect of the spring 12, and the are clamp piece 9 is released. In this way, the shoe can be clamped near the feet of the user, the heel of the shoe is still clamped, and the arc clamp piece 9 can assist the user in the wearing the shoe by means of its arc angle. The shoe lifter of the invention can be used as common shoe lifters, and particularly can assist the elder, pregnant women and people who have difficulty in moving in wearing shoes by themselves.

Furthermore, in this embodiment, to ensure that the push-and-pull rod 5 and the connecting rod 4 can act accordingly in structure after the front handle cover 2 moves, the front handle cover 2 is provided with a partition plate 13 beside the push-and-pull rod 5, and the rear handle cover 1 is provided with a partition plate 13 beside the connecting rod 4, and the position of the push-and-pull rod 5 and the position of the connecting rod 4 can be limited by means of the partition plate 13.

Furthermore, in this embodiment, to improve the clamping stability and prevent slipping after clamping, anti-slip teeth 14 are arranged on an end face, directly facing the fixed clamp piece 11, of the arc clamp piece 9, and the surface of the shoe can be clamped more effectively by means of the anti-slip teeth 14.

Furthermore, in this embodiment, a wavy concave surface 15 is arranged on an outer end face of the front handle cover 2 so that the user can hold the front handle cover 2 more easily.

Furthermore, in this embodiment, to prevent the inner walls of the front handle cover 2 and the rear handle cover 1 against excessive frictional resistance when the push-and-pull rod 5 moves, both ends of the push-and-pull rod 5 are of an arc shape.

The above embodiments are merely preferred ones of the invention, and are not intended to limit the patent scope of the invention. All equivalent structures or equivalent flow transformations made according to the contents of the description and drawings of the invention, or direct or indirect applications to other relating technical field should also fall within the protection scope of the invention.

What is claimed is:

1. A shoe lifter with a clamp, comprising a rear handle cover, a front handle cover and a clamp head, wherein the front handle cover is located on one side of the rear handle cover and has an end hinged to the rear handle cover, a connecting rod is disposed on the rear handle cover, a push-and-pull rod is hinged to one end of the connecting rod, a rope is connected to another end of the connecting rod, a tail end of the push-and-pull rod abuts against an inner wall of the front handle cover, the rear handle cover is connected to the clamp head through a pipe, a movable clamp piece is hinged to the clamp head and has an arc clamp edge and a connecting end, the clamp head is provided with a fixed clamp piece which is exactly opposite to the arc clamp edge, the connecting end is connected and limited in the clamp head, the rope penetrates through the pipe and is connected to the connecting end, and a portion, located between the connecting end and an inner wall of the clamp head, of the rope is sleeved with a spring.

2. The shoe lifter with a clamp according to claim 1, wherein the front handle cover is provided with a partition plate beside the push-and-pull rod, and the rear handle cover is provided with a partition plate beside the connecting rod.

3. The shoe lifter with a clamp according to claim 2, wherein anti-slip teeth are arranged on an end face, directly facing the fixed clamp piece, of the arc clamp edge.

4. The shoe lifter with a clamp according to claim 3, wherein a wavy concave surface is arranged on an outer end face of the front handle cover.

5. The shoe lifter with a clamp according to claim 4, wherein both ends of the push-and-pull rod are of an arc shape.

* * * * *